United States Patent
Ishii

(10) Patent No.: US 9,693,192 B2
(45) Date of Patent: Jun. 27, 2017

(54) INFORMATION PROCESSING APPARATUS, INFORMATION PROCESSING METHOD, INFORMATION PROCESSING PROGRAM, RECORDING MEDIUM STORING THEREON INFORMATION PROCESSING PROGRAM

(71) Applicant: Rakuten, Inc., Shinagawa-ku, Tokyo (JP)

(72) Inventor: Hiromitsu Ishii, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 480 days.

(21) Appl. No.: 14/352,196

(22) PCT Filed: Dec. 28, 2012

(86) PCT No.: PCT/JP2012/084183
§ 371 (c)(1),
(2) Date: Apr. 16, 2014

(87) PCT Pub. No.: WO2014/103052
PCT Pub. Date: Jul. 3, 2014

(65) Prior Publication Data
US 2016/0381503 A1    Dec. 29, 2016

(51) Int. Cl.
*H04W 24/00* (2009.01)
*H04W 4/02* (2009.01)
(Continued)

(52) U.S. Cl.
CPC ............ *H04W 4/023* (2013.01); *H04L 67/18* (2013.01); *H04L 67/10* (2013.01); *H04L 67/42* (2013.01)

(58) Field of Classification Search
CPC ........ H04W 4/023; H04L 67/18; H04L 67/10; H04L 67/42
(Continued)

(56) References Cited

U.S. PATENT DOCUMENTS 7,882,201 B2 * 2/2011 Frazier .............. G06F 17/30041
340/995.1
8,107,929 B2 * 1/2012 Citrin ................ G06F 17/30817
455/412.1
(Continued)

FOREIGN PATENT DOCUMENTS

JP          08-36041 A1    2/1996
JP         2009-004957 A   1/2009
(Continued)

OTHER PUBLICATIONS

Japanese Office Action of Japanese Patent App. No. 2013-532400 dated Jan. 28, 2014.
(Continued)

*Primary Examiner* — Marceau Milord
(74) *Attorney, Agent, or Firm* — Sughrue Mion, PLLC

(57) ABSTRACT

An information processing apparatus acquires posting data which is transmitted via a mobile communication network from a mobile terminal as a transmitter and which includes a keyword indicating a predetermined spot. The information processing apparatus acquires the position information corresponding to the keyword included in the posting data acquired by the first acquiring unit from a storing unit that stores the keyword indicating the predetermined spot and position information indicating a position of the spot in association with each other. The information processing apparatus outputs the acquired position information as information indicating a position at which it is possible to connect to the mobile communication network via which the acquired posting data was transmitted.

12 Claims, 8 Drawing Sheets

(51) Int. Cl.
*H04L 29/08* (2006.01)
*H04L 29/06* (2006.01)

(58) Field of Classification Search
USPC ............ 455/456.1, 456.3, 405, 404.2, 414.1,
455/414.4, 466, 518
See application file for complete search history.

(56) References Cited

U.S. PATENT DOCUMENTS

| | | | | |
|---|---|---|---|---|
| 8,155,667 | B2* | 4/2012 | Jang | H04L 12/5895 455/456.1 |
| 8,375,106 | B2* | 2/2013 | Sparks | G06F 17/30029 709/219 |
| 8,412,237 | B1* | 4/2013 | Ohme | H04W 4/021 348/14.02 |
| 8,499,243 | B2* | 7/2013 | Yuki | G06F 3/04817 715/735 |
| 8,527,597 | B2* | 9/2013 | Kennberg | G06Q 10/107 709/206 |
| 8,874,143 | B2* | 10/2014 | Okatake | H04W 16/18 455/405 |
| 8,989,713 | B2* | 3/2015 | Doulton | H04L 12/5835 455/413 |
| 9,330,139 | B2* | 5/2016 | Chen | G06F 17/30448 |
| 9,462,412 | B1* | 10/2016 | Ramachandran | G06F 17/3087 |
| 2004/0097244 | A1* | 5/2004 | Yamazaki | H04M 1/72572 455/456.3 |
| 2012/0190339 | A1* | 7/2012 | Abe | H04W 48/16 455/411 |
| 2014/0157142 | A1* | 6/2014 | Heinrich | H04L 67/1095 715/744 |
| 2014/0278613 | A1* | 9/2014 | Suzuki | G06Q 50/12 705/5 |
| 2015/0170210 | A1* | 6/2015 | Rhee | G06Q 30/0241 705/14.64 |

FOREIGN PATENT DOCUMENTS

| | | |
|---|---|---|
| JP | 2012-138965 A | 7/2012 |
| JP | 2012-205020 A | 10/2012 |

OTHER PUBLICATIONS

Japanese Office Action of Japanese Patent App. No. 2013-532400 dated Oct. 8, 2013.
International Search Report of PCT/JP2012/084183 dated Feb. 5, 2013.

* cited by examiner

FIG. 4A

KEYWORD ASSOCIATING DATABASE 521

| POSITION INFORMATION | | | KEYWORD |
|---|---|---|---|
| ADDRESS | FACILITY NAME | FLOOR | |
| 1-2, OO-KU, NAGANO-SHI | AA HOTEL | 1 | AA HOTEL, 3 MINUTES ON FOOT FROM XX STATION, LOBBY |
| 1-2, OO-KU, NAGANO-SHI | AA HOTEL | 2 | AA HOTEL, 3 MINUTES ON FOOT FROM XX STATION, RESTAURANT |
| JINGU, ATSUTA-KU, NAGOYA-SHI | ATSUTA-JINGU SHRINE | — | TREASURE MUSEUM, 5 MINUTES ON FOOT FROM ATSUTA-JINGU-SHRINE STATION |
| ...... | ...... | ...... | ...... |

FIG. 4B

POSTING MANAGEMENT DATABASE 522

| POSTING DATA | IMAGE DATA | POSITION INFORMATION | USER ID | UA | TRANSMITTER IP ADDRESS | PROCESSING COMPLETION FLAG |
|---|---|---|---|---|---|---|
| NOW, AT A LOBBY OF AA HOTEL 2012-12-06 16:00 | aaa.jpg | 35.633998, 139.715828 | U00001 | Ra···· | 1xx.0.0.1 | |
| AT TREASURE MUSEUM 2012-12-07 16:00 | bbb.jpg | 55.633998, 119.715528 | U00002 | GGG··· | — | 1 |
| ...... | ...... | ...... | ...... | ...... | ...... | ...... |

FIG. 4C

RESERVATION MANAGEMENT DATABASE 523

| LOCATION OF FACILITY | DATE | NUMBER OF MEMBERS | USER ID | CANCELLATION | PAYMENT OF ACCOUNT | |
|---|---|---|---|---|---|---|
| AA HOTEL, NAGOYA-SHI | 2012-12-07 | 2 | U00001 | NO | NO | |
| ...... | ...... | ...... | ...... | ...... | ...... | |

FIG. 4D

POSITION MANAGEMENT DATABASE 524

| POSITION INFORMATION INDICATING POSITION AT WHICH MOBILE TERMINAL CAN CONNECT | | | COMMUNICATION CARRIER | USER ID | DATE AND TIME |
|---|---|---|---|---|---|
| ADDRESS | FACILITY NAME | FLOOR | | | |
| 1-2, OO-KU, NAGOYA-SHI | AA HOTEL | 1 | Raxx | U00001 | 2012-12-06 16:00 |
| JINGU, ATSUTA-KU, NAGOYA-SHI | ATSUTA-JINGU SHRINE | — | GGG | U00002 | 2012-12-07 16:00 |
| ...... | ...... | ...... | ...... | ...... | ...... |

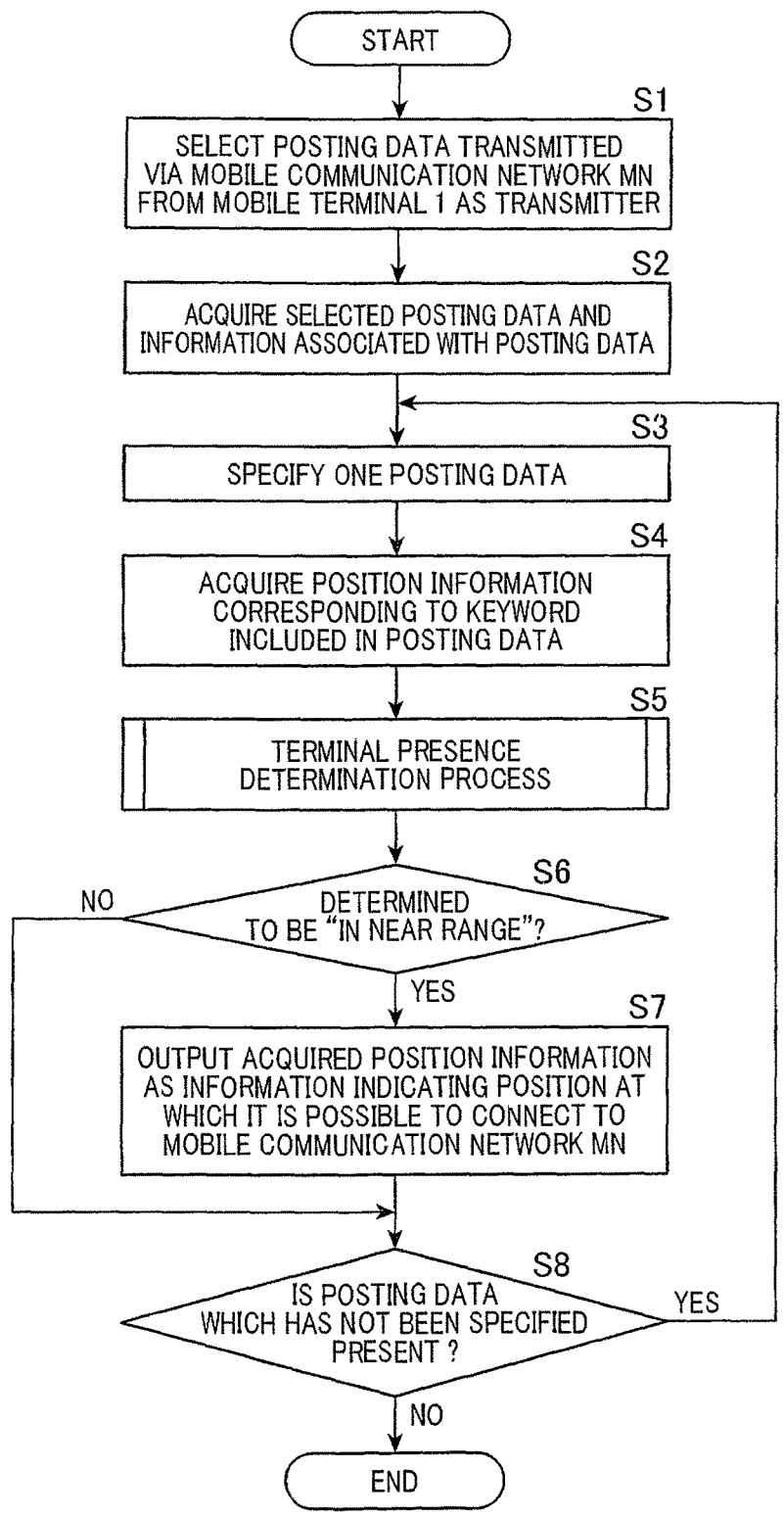

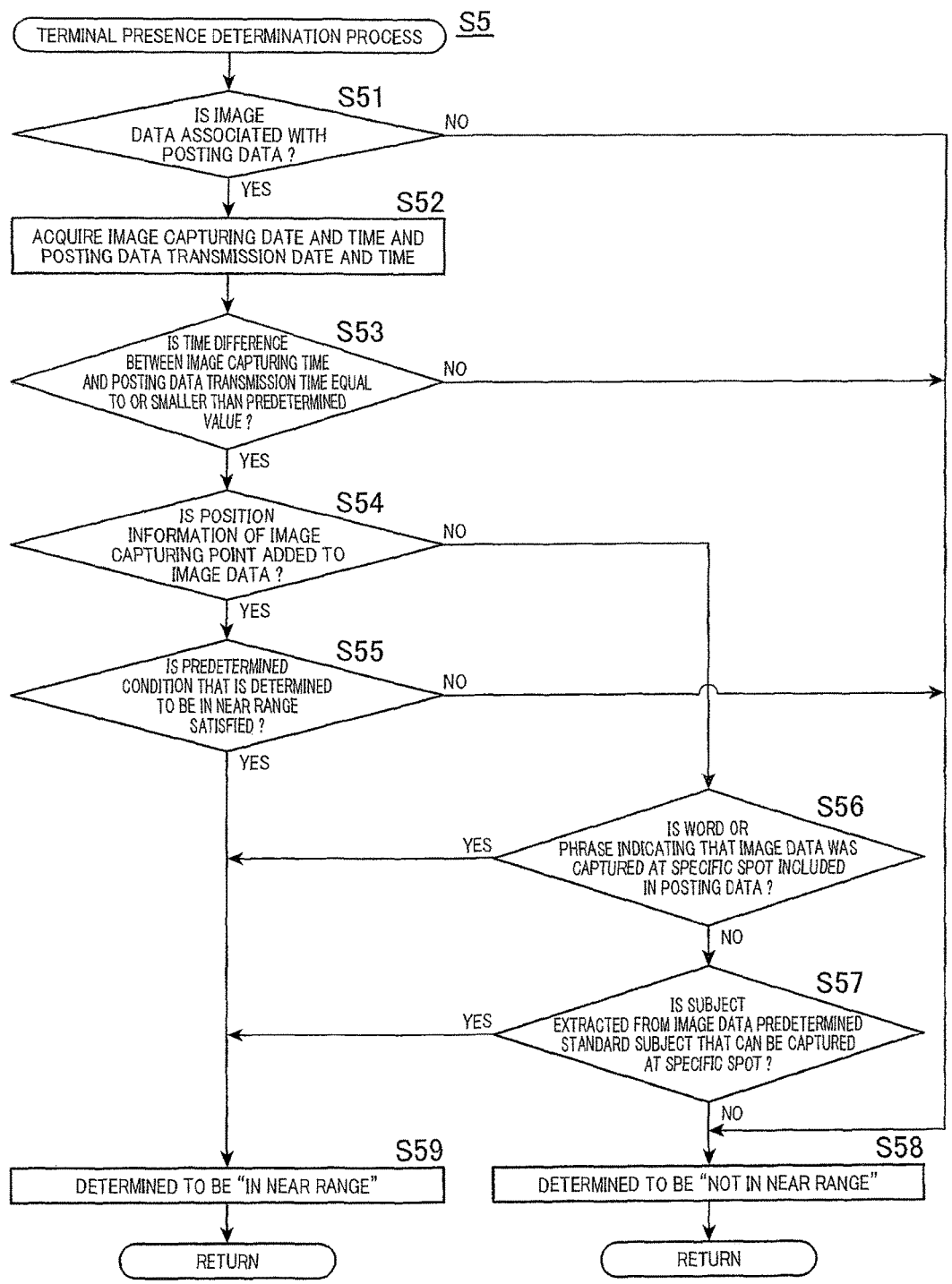

INFORMATION PROCESSING APPARATUS, INFORMATION PROCESSING METHOD, INFORMATION PROCESSING PROGRAM, RECORDING MEDIUM STORING THEREON INFORMATION PROCESSING PROGRAM

CROSS REFERENCE TO RELATED APPLICATIONS

This is a National Stage of International Application No. PCT/JP2012/084183 filed Dec. 28, 2012, the content of all of which is incorporated herein by reference in its entirety.

TECHNICAL FIELD

The present invention relates to s technical field of apparatuses and methods for specifying a position at which a mobile terminal can communicate via a mobile communication network.

BACKGROUND ART

There is a need to check in advance whether a mobile terminal can communicate via a mobile communication network operated by a specific communication carrier (telecommunications carrier) at a specific position. The position at which a mobile terminal can communicate via a mobile communication network, for example, can be specified with a certain degree of accuracy by collecting and analyzing data to which position information is added and which is transmitted from a mobile terminal having a global positioning system (GPS) function mounted thereon. Techniques for improving the accuracy of the positioning by GPS have been proposed (for example, refer to Patent Literature 1).

PRIOR ART LIST

Patent Literature

Patent Literature 1: JP 8-36041 A

SUMMARY OF THE INVENTION

Problem to be Solved by the Invention

However, it is generally difficult to receive radio waves from GPS satellites at such an obstructed position (for example, indoors, underground, or deep in the mountains) that is surrounded by obstacles blocking radio waves. In other words, there is a possibility that the GPS does not function properly at such a position where there is a high need to check in advance whether a mobile terminal can communicate via a mobile communication network. Thus, it is difficult to obtain data to which position information indicating such an obstructed position is added.

An object of the present invention is to specify a position at which a mobile terminal can communicate via a mobile communication network independently of the GPS.

Means for Solving the Problem

In order to solve the above problem, according to an exemplary embodiment of the present disclosure an information processing apparatus comprises:

a first acquiring means that acquires posting data which is transmitted via a mobile communication network from a mobile terminal as a transmitter and which includes a keyword indicating a predetermined spot;

a second acquiring means that acquires the position information corresponding to the keyword included in the posting data acquired by the first acquiring means from a storing means that stores the keyword indicating the predetermined spot and position information indicating a position of the spot in association with each other; and an outputting means that outputs the position information acquired by the second acquiring means as information indicating a position at which it is possible to connect to the mobile communication network via which the posting data acquired by the first acquiring means was transmitted.

According to this invention, it is possible to specify a position at which a mobile terminal can communicate via a mobile communication network independently of the GPS.

According to another exemplary embodiment of the present disclosure the information processing apparatus further comprises:

a determining means that determines whether a mobile terminal which is the transmitter had been present in a range near a position indicated by the position information acquired by the second acquiring means at the time of transmitting the posting data based on related information acquired in association with the posting data, which contributes to determination of the position at which the mobile terminal which is the transmitter was present at the time of transmitting the posting data acquired by the first acquiring means, wherein the outputting means outputs the position information acquired by the second acquiring means when the determining means determines that the mobile terminal had been present in the range.

According to this invention, it is possible to more accurately specify a position at which a mobile terminal can communicate via a mobile communication network.

An exemplary aspect of the present disclosure describes the information processing apparatus, wherein the first acquiring means acquires the posting data to which image data is added as the related information, and the determining means determines that the mobile terminal had been present in the range near the position at the time of transmitting the posting data when at least a condition that a time difference between an image capturing time of the image data added to the posting data and the posting data transmission time is a predetermined value or smaller is satisfied.

According to this invention, it is possible to increase the reliability of the determination that the mobile terminal had been present in the range near the position at the time of transmitting the posting data.

Another exemplary aspect of the present disclosure describes the information processing apparatus, wherein position information of the image capturing point is added to the image data, and the determining means determines that the mobile terminal had been present in the range near the position at the time of transmitting the posting data when the condition is satisfied and a predetermined condition that the position indicated by the position information acquired by the second acquiring means is determined to be near the position indicated by the position information added to the image data is satisfied.

According to this invention, it is possible to further increase the reliability of the determination that the mobile terminal had been present in the range near the position at the time of transmitting the posting data.

Yet another exemplary aspect of the present disclosure describes the information processing apparatus, wherein the determining means determines that the mobile terminal had been present in the range near a position at the time of transmitting the posting data when the condition is satisfied and a word or a phrase indicating that the image of the image data was captured at the spot is included in the posting data.

According to this invention, it is possible to further increase the reliability of the determination that the mobile terminal had been present in the range near the position at the time of transmitting the posting data.

Yet another exemplar aspect of the present disclosure describes the information processing apparatus, wherein the determining means determines that the mobile terminal had been present in the range near the position at the time of transmitting the posting data when the condition is satisfied and a subject extracted from the image data is a predetermined subject that can be captured at the spot.

According to this invention, it is possible to further increase the reliability of the determination that the mobile terminal had been present in the range near the position at the time of transmitting the posting data.

Yet another exemplary aspect of the present disclosure describes the information processing apparatus, wherein the determining means determines that the mobile terminal had been present in the range near the position at the time of transmitting the posting data when at least a condition that a reservation history of making use reservation for a facility within a predetermined range from the spot with a day including the posting data transmission time as the date of use or a reservation history of making lodging reservation for the facility with the day before or the day including the posting data transmission time as an accommodation date, of the user who posted the posting data is stored as the related information, is stored in a storing means that stores a reservation history of a user having made facility use reservation or lodging reservation, is satisfied.

According to this invention, it is possible to increase the reliability of the determination that the mobile terminal had been present in the range near the position at the time of transmitting the posting data.

Yet another exemplary aspect of the present disclosure describes the information processing apparatus, wherein the determining means determines that the mobile terminal had been present in the range near the position at the time of transmitting the posting data when the condition is satisfied and the use reservation or the lodging reservation is not cancelled.

According to this invention, it is possible to further increase the reliability of the determination that the mobile terminal had been present in the range near the position at the time of transmitting the posting data.

Yet another exemplary aspect of the present disclosure describes the information processing apparatus, wherein the determining means determines that the mobile terminal had been present in the range near the position at the time of transmitting the posting data when the condition is satisfied and charges corresponding to the use reservation or the lodging reservation are paid.

According to this invention, it is possible to further increase the reliability of the determination that the mobile terminal had been present in the range near the position at the time of transmitting the posting data.

Yet another exemplary aspect of the present disclosure describes the information processing apparatus, wherein the determining means determines that the mobile terminal had been present in the range near the position at the time of transmitting the posting data when a word or a phrase expressed with the assumption that a poster was at the spot at the time of transmitting the posting data is included in the posting data as the related information.

According to this invention, it is possible to increase the reliability of the determination that the mobile terminal had been present in the range near the position at the time of transmitting the posting data.

Yet another exemplary aspect of the present disclosure describes the information processing apparatus, wherein the first acquiring means acquires the posting data to which position information is added as the related information, and the determining means determines that the mobile terminal had been present in the range near the position at the time of transmitting the posting data when a predetermined condition that the position indicated by the position information acquired by the second acquiring means is determined to be near the position indicated by the position information added to the posting data is satisfied.

According to this invention, it is possible to increase the reliability of the determination that the mobile terminal had been present in the range near the position at the time of transmitting the posting data.

According to an exemplary embodiment of the present disclosure an information processing method executed by a computer, comprises:

a first acquiring step of acquiring posting data which is transmitted via a mobile communication network from a mobile terminal as a transmitter and which includes a keyword indicating a predetermined spot;

a second acquiring step of acquiring the position information corresponding to the keyword included in the posting data acquired in the first acquiring step from a storing means that stores the keyword indicating the predetermined spot and position information indicating a position of the spot in association with each other; and an outputting step of outputting the position information acquired in the second acquiring step as information indicating a position at which it is possible to connect to the mobile communication network via which the posting data acquired by the first acquiring means was transmitted.

Another exemplary embodiment of the present disclosure describes an information processing program for causing a computer to function as:

a first acquiring means that acquires posting data which is transmitted via a mobile communication network from a mobile terminal as a transmitter and which includes a keyword indicating a predetermined spot;

a second acquiring means that acquires the position information corresponding to the keyword included in the posting data acquired by the first acquiring means from a storing means that stores the keyword indicating the predetermined spot and position information indicating a position of the spot in association with each other; and an outputting means that outputs the position information acquired by the second acquiring means as information indicating a position at which it is possible to connect to the mobile communication network via which the posting data acquired by the first acquiring means was transmitted.

Yet another exemplary embodiment of the present disclosure describes a computer-readable recording medium storing thereon an information processing program, which causes a computer to function as:

a first acquiring means that acquires posting data which is transmitted via a mobile communication network from a mobile terminal as a transmitter and which includes a keyword indicating a predetermined spot;

a second acquiring means that acquires the position information corresponding to the keyword included in the posting data acquired by the first acquiring means from a storing means that stores the keyword indicating the predetermined spot and position information indicating a position of the spot in association with each other; and an outputting means that outputs the position information acquired by the second acquiring means as information indicating a position at which it is possible to connect to the mobile communication network via which the posting data acquired by the first acquiring means was transmitted.

Advantageous Effects of the Invention

According to this invention, it is possible to specify a position at which a mobile terminal can communicate via a mobile communication network independently of the GPS.

BRIEF DESCRIPTION OF THE DRAWINGS

FIG. 4A is a diagram illustrating an example of the content registered in a keyword association database 521, FIG. 4B is a diagram illustrating an example of the content registered in a posting management database 522, FIG. 4C is a diagram illustrating an example of the content registered in a reservation management database 523, and FIG. 4D is a diagram illustrating an example of the content registered in a position management database 524.

FIG. 5 is a flowchart illustrating a position analysis process of the system control unit 54 of the position analysis processing server 5.

FIG. 6 is a flowchart illustrating a specific example of a terminal presence determination process in step S5.

MODE FOR CARRYING OUT THE INVENTION

Hereinafter, an embodiment of the present invention will be described in detail with reference to the drawings. The embodiment described below is an embodiment when the present invention is applied to an information providing system.

[1. Overview of Configuration and Function of Information Providing System]

Figure 1:
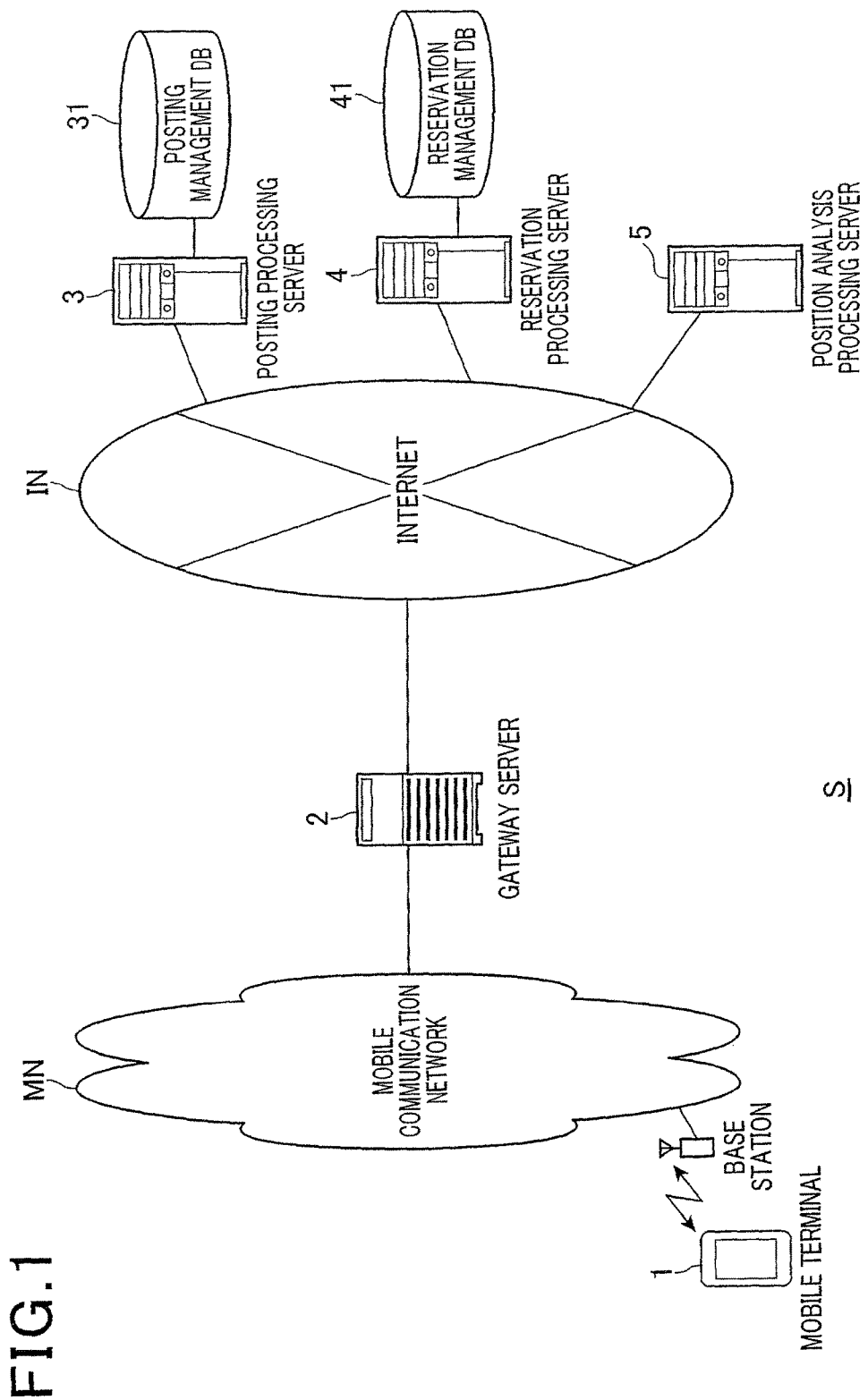
FIG. 1 is a diagram illustrating an example of a schematic configuration of an information providing system according to the present embodiment.

First, an overview of the configuration and function of an information providing system S according to an embodiment of the present invention will be described with reference to FIG. 1. FIG. 1 is a diagram illustrating an example of a schematic configuration of the information providing system S according to the present embodiment. As illustrated in FIG. 1, the information providing system S is configured to include a mobile terminal 1, a gateway server 2, a posting processing server 3, a reservation processing server 4, and a position analysis processing server 5.

The mobile terminal 1 is a mobile communication apparatus having a communication function such as a mobile phone, a smartphone, or a mobile game machine. The mobile terminal 1 is configured to be able to connect to a mobile communication network (carrier network) MN via a base station in a coverage range where radio waves from the base station of the mobile communication network MN reach and to connect to the Internet IN via the mobile communication network MN. The mobile communication network MN is a network configured to include a 3G communication circuit that is established and operated by a communication carrier. Moreover, when the mobile terminal 1 has a wireless LAN function, the mobile terminal 1 can perform radio communication with a mobile router (also referred to as a "mobile Wi-Fi (registered trademark) router") using the wireless LAN function, connect to the mobile communication network MN via the mobile router, and connect to the Internet IN via the mobile communication network MN. In this case, the mobile router connects to the mobile communication network MN via the base station. The mobile router is carried by, for example, the user of the mobile terminal 1 together with the mobile terminal 1. In the example of FIG. 1, only one mobile terminal 1 is illustrated, but, practically, the mobile terminal 1 is possessed by each user, for example. Moreover, although only one mobile communication network MN is illustrated, practically, each communication carrier operates respective mobile communication network MN.

The gateway server 2 is a server that is connected to the mobile communication network MN and the Internet IN so as to relay various types of data (packets) between the mobile communication network MN and the Internet IN. On the Internet IN side, data communication is performed according to the hypertext transfer protocol (HTTP). On the mobile communication network MN side, data communication is performed according to a communication protocol corresponding to the communication carrier. Thus, the gateway server 2 performs a process such as protocol conversion during relaying of data. The access from the browser of the mobile terminal 1 to a website on the Internet IN is performed via the mobile communication network MN and the gateway server 2. The gateway server 2 is established and operated by, for example, each communication carrier.

The posting processing server 3 is a server which is connected to the Internet IN, for example, so as to operate a website that registers and opens the posting data from the mobile terminal 1 or a personal computer (not illustrated). Examples of this website include a blog site, a social networking server (SNS) site (community site), a miniblog site (for example, a Twitter (registered trademark) site or the like), and a word-of-mouth site. Besides this, examples of the website include a shopping site, an auction site, a travel reservation site, a lodging reservation site, a facility service reservation site, and the like that register and open posting data. The posting processing server 3, for example, is provided in each of these sites. The posting processing server 3 may be configured by one server that has a web server function and may be configured from a plurality of servers of which the functions are divided into, for example, a web server, an application server, a database server, and the like. Although the present embodiment illustrates an example in which the posting processing server 3 is connected to the Internet IN, the posting processing server 3 may be connected to the mobile communication network MN.

Upon receiving the posting data transmitted from the mobile terminal 1 or the personal computer, the posting processing server 3 registers the received posting data in the posting management database (DB) 31. The posting data includes, for example, a posting date and time (transmission date and time of posting data) and posting content. The posting content indicates, for example, an entry of blogs, a tweet, the comments (messages) on the SNS, word-to-mouth, or the like. In some cases, the posting content includes a keyword indicating a specific spot (place).

Figure 2B:
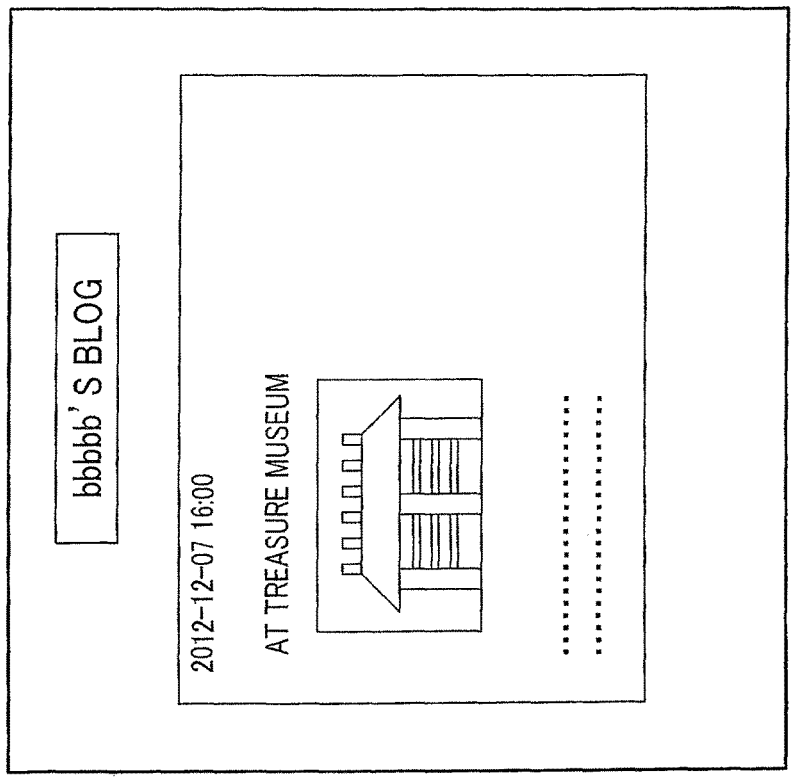
FIG. 2A and FIG. 2B are diagrams illustrating an example of a display screen on which posting data acquired from a blog site by a browser of a mobile terminal 1 is displayed.
Figure 2A:
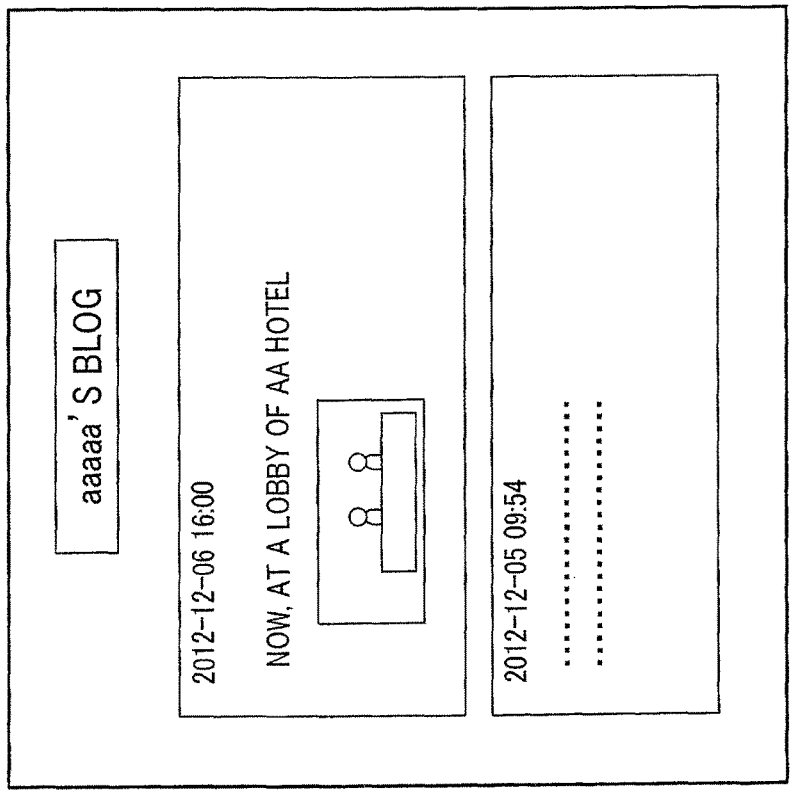

FIG. 2A and FIG. 2B are diagrams illustrating an example of a display screen on which posting data acquired from a blog site by the browser of the mobile terminal 1 is displayed. For example, "AA Hotel" and "Lobby" included in the posting data displayed in FIG. 2A and "Treasure museum" included in the posting data displayed in FIG. 2B correspond to keywords that indicate spots. The present embodiment is configured such that the position information corresponding to the position of the spot is specified using the keywords indicating spots, included in the posting data.

Although the posting data is included in the body of an HTTP request, for example, and is received by the posting processing server 3, the header of the HTTP request received via the mobile communication network MN and the gateway server 2 generally includes a user agent (UA). In some case, the user agent includes a character string indicating at least one of the communication carrier name and the model name of the mobile terminal 1. In this case, the posting data and the user agent (including the character string indicating at least one of the communication carrier name and the model name of the mobile terminal 1) in the HTTP request that includes the posting data are registered in the posting management database 31 in association with each other. It may be configured such that the IP address of the transmitter of the posting data received by the posting processing server 3 is registered in the posting management database 31 in association with the posting data. In this case, the IP address of the transmitter is, for example, the IP address of the gateway server 2 that relayed the posting data.

Moreover, when a website requires a login process during registration of posting data, the posting data and the user ID of a user of the mobile terminal 1 or the personal computer that transmitted the posting data are registered in the posting management database 31 in association with each other. Here, the user ID is user identification information for identifying a user. This user ID is included (or added to) in, for example, the posting data. In some cases, the posting data includes identification information such as a cookie ID corresponding to the user ID rather than the user ID. In this case, it may be configured such that the identification information such as a cookie ID is registered in the posting management database 31 as the user ID in association with the posting data. Moreover, in some case, image data (picture data) is added (attached) to the posting data transmitted from the mobile terminal 1 or the personal computer. In this case, the posting data and the image data added to the posting data are registered in the posting management database 31 in association with each other. In some cases, an image capturing date can be acquired from the image data. Moreover, in some cases, for example, when the mobile terminal 1 has a camera function and a GPS function, position information indicating the latitude and longitude detected by the GPS function is added (for example, as a geotag) to the image data captured by the camera function. In this case, the posting data and the image data to which the position information is added are registered in the posting management database 31 in association with each other. The position information added to the image data is position information indicating an image capturing point. Alternatively, in some cases, the position information indicating the latitude and longitude detected by the GPS function is added to the posting data itself. In this case, the posting data and the position information indicating the latitude and longitude added to the posting data are registered in the posting management database 31 in association with each other. The position information added to the posting data is position information indicating a transmission point of the posting data.

The reservation processing server 4 is a server which is connected to the Internet IN, for example, so as to operate a website that registers facility service reservation or facility lodging reservation in response to a facility service reservation request or a facility lodging reservation request from the mobile terminal 1 or the personal computer. Examples of this website include a travel reservation site, a facility lodging reservation site, and a facility service reservation site. Examples of the facility include a hotel, an inn, a restaurant, a Japanese-style restaurant, a concert venue, a playhouse, an event venue, a golf link, a golf practice range, a hair salon, a museum, and a movie theater. These facilities are examples and the present invention is not limited to these facilities. The reservation processing server 4 is provided in, for example, each of these sites. The reservation processing server 4 may be configured by one server that has a web server function and may be configured from a plurality of servers of which the functions are divided into, for example, a web server, an application server, a database server, and the like. Although the present embodiment illustrates an example in which the reservation processing server 4 is connected to the Internet IN, the reservation processing server 4 may be connected to the mobile communication network MN.

After a user logs in, upon receiving reservation data necessary for reservation together with the facility service reservation request or the facility lodging reservation request from the mobile terminal 1 or the personal computer, the reservation processing server 4 registers the reservation data in the reservation management database (DB) 41 in association with the user ID of the user who made the reservation. For example, the reservation data includes the place (for example, the address or the position information indicating the latitude or longitude) of the facility, the date of use or the accommodation date, the number of members who will use or stay. Moreover, when the user pays the charges corresponding to the facility service reservation or the facility lodging reservation, the information on the payment of the charges is registered in the reservation management database 41. Moreover, when the user cancels the facility service reservation or the facility lodging reservation, the cancellation information is registered in the reservation management database 41. The information registered in the reservation management database 41 constitutes a reservation history of the user having made the service reservation or the lodging reservation for the facility.

The position analysis processing server 5 is an example of an information processing apparatus according to the present invention and is connected to, for example, the Internet IN. The position analysis processing server 5 may be incorporated as, for example, one of the servers for operating a website that registers and opens the posting data. Moreover, the position analysis processing server 5 may be incorporated as, for example, one of the servers for operating a website that registers the service reservation or the lodging reservation for facilities. Moreover, although the present embodiment illustrates an example in which the position analysis processing server 5 is a server connected to the Internet IN, the position analysis processing server 5 may be connected to the mobile communication network MN.

Figure 3A:
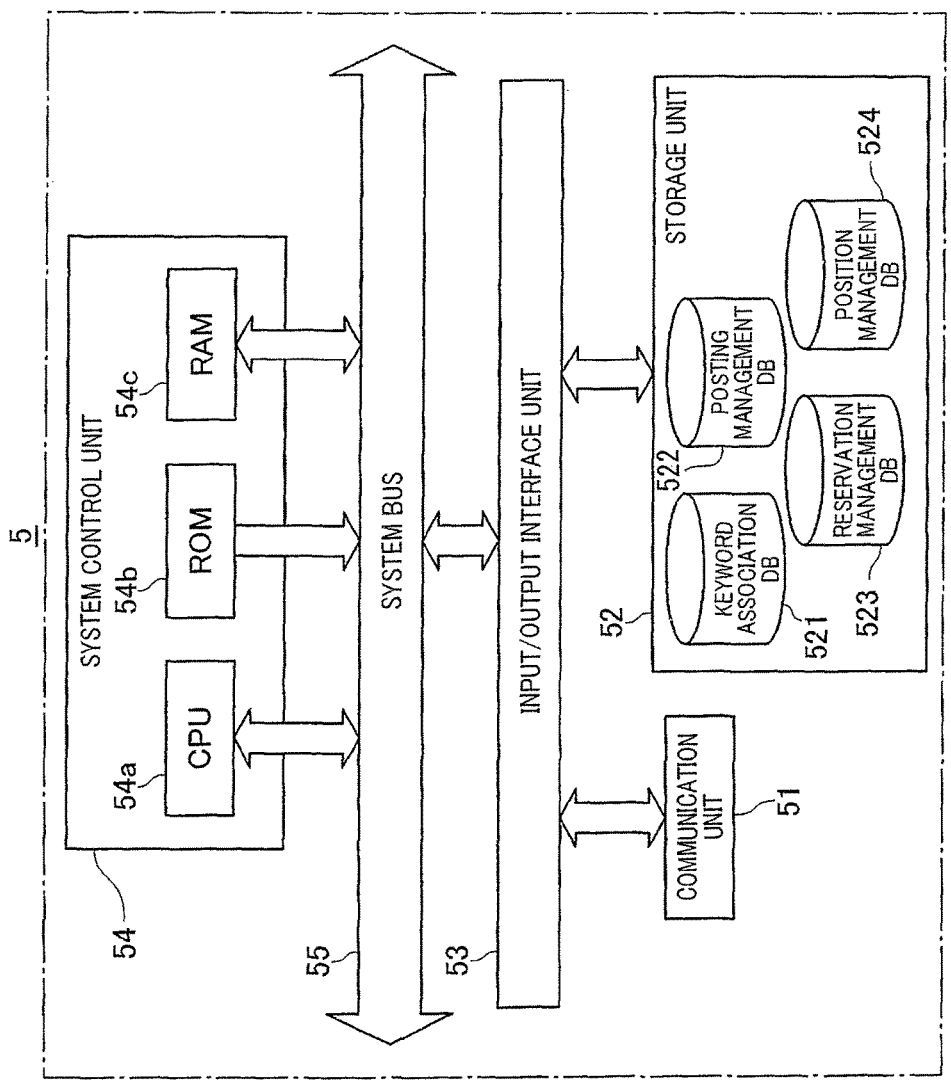
FIG. 3A is a diagram illustrating an example of a schematic configuration of a position analysis processing server 5 according to the present embodiment.

FIG. 3A is a diagram is a diagram illustrating an example of a schematic configuration of the position analysis processing server 5 according to the present embodiment. As illustrated in FIG. 3A, the position analysis processing server 5 includes a communication unit 51, a storage unit 52 (an example of a storing means), an input/output interface unit 53, and a system control unit 54. The system control unit 54 and the input/output interface unit 53 are connected via a system bus 55. The communication unit 51 is connected to the Internet IN to control a communication state.

The storage unit 52 is configured as, for example, a hard disk drive, and stores various programs such as an operating system and a position analysis processing program (including an information processing program according to the present invention). The position analysis processing program may be downloaded from a predetermined server or the like via the Internet IN and may be recorded on a recording medium such as a compact disc (CD) or a digital versatile disc (DVD) and read.

Moreover, the storage unit 52 stores a keyword association database (DB) 521, a posting management database (DB) 522, a reservation management database (DB) 523, and a position management database (DB) 524. These databases may be stored in another server different from the position analysis processing server 5 rather than being stored in the storage unit 52.

The keyword association database 521 registers a keyword indicating a specific spot and position information indicating the position of the spot in association with each other. The keyword indicating the specific spot and the position information indicating the position of the spot are registered in advance by, for example, a system administrator. FIG. 4A illustrates an example of the content registered in the keyword association database 521. In the first record of the keyword association database 521 illustrated in FIG. 4A, "AA Hotel, 3 Minutes on foot from station, Lobby" which are keywords indicating a spot and "1st floor, AA Hotel, 1-2, OO-ku, Nagoya-shi" which is the position information indicating the position of the spot are registered in association with each other. In this example, although the position of the spot is specified by the address, the facility name, and the floor, the latitude and longitude may be used instead of the address. The floor is information indicating an altitude (height). In this way, in this example, the position information defines the spatial position ((latitude, longitude, altitude) or (address and floor)) of the spot.

The posting management database 522 registers posting data. FIG. 4B illustrates an example of the content registered in the posting management database 522. The posting data registered in the posting management database 522 is acquired at a predetermined point in time from the posting management database 31 of the posting processing server 3 of each website. In this way, posting data posted on various websites such as a blog site, an SNS site, and a miniblog site is collected in the posting management database 522. As described above, the information such as the user ID registered in the posting management database 31 in association with the posting data is acquired together with the posting data and is registered in the posting management database 522 as illustrated in FIG. 4B. Moreover, among the items of posting data registered in the posting management database 522, a processing completion flag is associated with the posting data used for a position analysis process described later.

The reservation management database 523 registers the reservation history of the user having made the facility service reservation or the facility lodging reservation. For example, the reservation history registered in the reservation management database 523 is acquired at a predetermined point in time from the reservation management database 41 of the reservation processing server 4 of each website. As described above, the user ID registered in association with the reservation history in the reservation management database 41 is acquired together with the reservation history and is registered in the reservation management database 523 as illustrated in FIG. 4C.

The position management database 524 registers information indicating the position at which the mobile terminal 1 can connect to the mobile communication network MN. FIG. 4D illustrates an example of the content registered in the position management database 524. In the first record of the position management database 524 illustrated in FIG. 4D, the position information indicating the position at which the mobile terminal 1 can connect to the mobile communication network MN, the information indicating the communication carrier operating the mobile communication network MN, the user ID of the user of the mobile terminal 1, and the like are registered in association with each other.

Figure 3B:
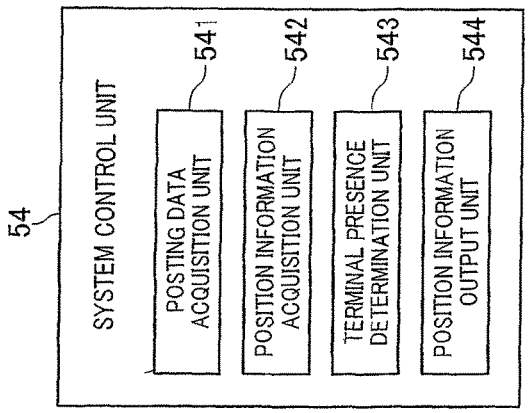
FIG. 3B is a diagram illustrating an example of a functional block of a system control unit 54.

The system control unit 54 is configured to include a central processing unit (CPU) 54a, a read only memory (ROM) 54b, a random access memory (RAM) 54c, and the like. FIG. 3B is a diagram illustrating an example of a functional block of the system control unit 54. The system control unit 54 as a computer executes the position analysis process according to the position analysis processing program stored in the storage unit 52. With such a process, as illustrated in FIG. 3B, the system control unit 54 functions as a posting data acquisition unit 541, a position information acquisition unit 542, a terminal presence determination unit 543, a position information output unit 544, and the like. The posting data acquisition unit 541 is an example of a first acquiring means of the present invention. The position information acquisition unit 542 is an example of a second acquiring means of the present invention. The terminal presence determination unit 543 is an example of a determining means of the present invention. The position information output unit 544 is an example of an outputting means of the present invention.

The posting data acquisition unit 541 acquires the posting data transmitted from the mobile terminal 1 as a transmitter via the mobile communication network MN and the information associated with the posting data from the posting management database 522. The posting data acquired by the posting data acquisition unit 541 includes posting data that is transmitted from the mobile terminal 1 as a transmitter via the mobile communication network MN by the mobile router. For example, the posting data acquired by the posting data acquisition unit 541 does not include posting data that is transmitted from a personal computer without via the mobile communication network MN.

The position information acquisition unit 542, for example, acquires the position information (that is, the position information indicating the position of the spot) corresponding to the keyword included in the posting data acquired by the posting data acquisition unit 541 from the keyword association database 521. When the keyword association database 521 is stored in another server different from the position analysis processing server 5, the position information acquisition unit 542 transmits a search query including the keyword included in the posting data acquired by the posting data acquisition unit 541 to the other server to thereby acquire the position information corresponding to the keyword included in the posting data from the other server. With the position information acquisition unit 542, it is possible to acquire the position information indicating the position of the spot at which it was expected that the transmitting mobile terminal 1 which is the transmitter of the posting data had been present at the time of transmitting the posting data. However, at this stage, the mobile terminal 1 which is the transmitter of the posting data would have not been present at the position of the spot or near the position. Due to this, the terminal presence determination unit 543 is provided so as to ensure with a certain degree of reliability or higher that the mobile terminal 1 which is the transmitter of the posting data had been present at the position of the spot or near the position at the time of transmitting the posting data.

The terminal presence determination unit 543 determines whether the mobile terminal 1 which is the transmitter of the posting data had been present in a range (hereinafter referred to as a "near range") near the position corresponding to the position information acquired by the position information acquisition unit 542 at the time of transmitting the posting data based on the related information acquired in association with the posting data, which contributes to determination of the position of the mobile terminal 1 which is the transmitter of the posting data at the time of transmitting the posting data acquired by the posting data acquisition unit 541. Here, the examples of the "related information" include "image data added to the posting data," "position information added to the posting data," "word or phrase expressed with the assumption that the poster was in the spot at the position corresponding to the position information," "word or phrase expressed with the assumption that the poster was not in the spot at the position corresponding to the position information," and "reservation history that can be acquired based on the user ID of the user of the mobile terminal 1 which is the transmitter of the posting data". Examples of the expression "present in the near range of the position corresponding to the position information" include "present within a predetermined distance range (for example, 1 to 2 m) from the position corresponding to the position information," "present in a predetermined area (for example, a predetermined street address) to which the position corresponding to the position information belong," and "present in a range that can be reached within a predetermined period (for example, several tens of seconds) from the position corresponding to the position information". The determination on "whether present in the near range of the position corresponding to the position information" is to determine whether the possibility that the mobile terminal 1 which is the transmitter had been present at the position of the spot corresponding to the keyword included in the posting data or near the position at the time of transmitting the posting data. With the terminal presence determination unit 543, it is possible to specify with a certain degree of reliability or higher whether the mobile terminal 1 which is the transmitter of the posting data relating to the spot had been present at the position of the spot or near the position at the time of transmitting the posting data using the related information relating to the posting data. Details of a method of determining the presence of the mobile terminal 1 based on the related information will be described later.

When the terminal presence determination unit 543 determines that the mobile terminal 1 had been present within the predetermined range, the position information output unit 544 outputs the position information acquired by the position information acquisition unit 542 as information indicating the position at which the mobile terminal 1 can connect to the mobile communication network MN via which the posting data acquired by the posting data acquisition unit 541 was transmitted. Examples of an output destination to which the position information output unit 544 outputs the position information include the position management database 524, another server, an administrator terminal, a portable storage medium, or the like. The information output by the position information output unit 544 may include information indicating the communication carrier operating the mobile communication network MN via which the posting data acquired by the posting data acquisition unit 541 was transmitted as well as the position information acquired by the position information acquisition unit 542. The information output by the position information output unit 544 may further include the posting data acquired by the posting data acquisition unit 541 and the user ID of the user of the mobile terminal 1 which is the transmitter of the posting data.

[2. Operation of Information Providing System S]

Next, the operation of the information providing system S according to the present embodiment will be described with reference to FIG. 5. FIG. 5 is a flowchart illustrating the position analysis process of the system control unit 54 of the position analysis processing server 5. In the following description, it is assumed that the posting data acquired from the posting management database 31 of the posting processing server 3 is registered in the posting management database 522. It is also assumed that the reservation history acquired from the reservation management database 41 of the reservation processing server 4 is registered in the reservation management database 523.

The process illustrated in FIG. 5 is executed, for example, every predetermined time period (for example, every 24 hours). When the process illustrated in FIG. 5 starts, the posting data acquisition unit 541 selects posting data which has been transmitted from the mobile terminal 1 as a transmitter via the mobile communication network MN among the items of posting data which are registered in the posting management database 522 but are not associated with the processing completion flag (step S1). For example, the posting data acquisition unit 541 selects the posting data which has been transmitted from the mobile terminal 1 as a transmitter via the mobile communication network MN based on the user agent (the character string indicating the communication carrier) or the transmitter IP address correlated with the posting data registered in the posting management database 522.

However, when the posting data is transmitted via the mobile communication network MN by the mobile router, since the user agent may sometimes not be included in the header of the request, it may be difficult to select the posting data based on the user agent. Alternatively, even when the user agent is included in the header of the request, there may be a case where it is difficult to select the posting data which has been transmitted via the mobile communication network MN from the mobile terminal 1 as a transmitter due to the fact that it is not possible to specify the communication carrier from the information in the user agent. Thus, in such a case, it is preferable to select the posting data based on the transmitter IP address correlated with the posting data, for example. When it is possible to specify the communication carrier based on a network portion (indicating the network to which a host belongs) of the transmitter IP address, it is possible to select the posting data based on the transmitter IP address. In this case, for example, since the mobile communication network MN as the network to which the gateway server 2 that relayed the posting data is described in the network portion of the transmitter IP address, it is possible to select the posting data based on the transmitter IP address. Moreover, when the posting data is transmitted via the mobile communication network MN, the transmitter IP address is the IP address of the gateway server 2. Due to this, when the list of the IP addresses of the gateway servers 2 is stored in advance in the storage unit 52, the posting data acquisition unit 541 can select the posting data based on the transmitter IP address by referring to the list.

When the posting data acquisition unit 541 acquires the posting data from the posting management database 31 of the posting processing server 3, the posting data acquisition unit 541 may be configured to select the posting data which has been transmitted via the mobile communication network MN from the mobile terminal 1 as a transmitter and register the posting data in the posting management database 522. In this case, it is not necessary to select the posting data in step S1.

Subsequently, the posting data acquisition unit 541 acquires the posting data selected in step S1 and the information associated with the posting data, for example, from the posting management database 522 (step S2). In this way, for example, a plurality of items of posting data is acquired. Subsequently, the position information acquisition unit 542 specifies one posting data among the items of posting data acquired in step S2 (step S3). Subsequently, the position information acquisition unit 542 acquires position information corresponding to the keyword included in the posting data specified in step S3 from the keyword association database 521, for example, (step S4). For example, it is assumed that "AA Hotel" and "Lobby" are included in the posting data specified in step S3 and that the keyword association database 521 illustrated in FIG. 4A is referred to. In this case, keywords "AA Hotel" and "Lobby" are extracted, for example, by morphological analysis or the like, from the posting data specified in step S3, and the position information (the position information indicating the position of the spot) "First floor, AA Hotel, 1-2, OO-ku, Nagoya-shi" associated with the keywords identical to the extracted keywords (a set of keywords) "AA Hotel" and "Lobby" is acquired from the keyword association database 521 illustrated in FIG. 4A.

Subsequently, the terminal presence determination unit 543 executes the terminal presence determination process (step S5). In the terminal presence determination process, the terminal presence determination unit 543 determines whether the mobile terminal 1 which is the transmitter had been present in the near range of the position corresponding to the position information acquired in step S4 at the time of transmitting the posting data based on the related information that contributes to determination of the position at which the mobile terminal 1 which is the transmitter had been present at the time of transmitting the posting data specified in step S3.

FIG. 6 to FIG. 8B are flowcharts illustrating specific examples of the terminal presence determination process in step S5.

First, the terminal presence determination process illustrated in FIG. 6 will be described. In the process illustrated in FIG. 6, first, the terminal presence determination unit 543 determines whether image data is associated with the posting data specified in step S3 (step S51). For example, when the image data is registered in the posting management database 31 in association with the posting data specified in step S3, it is determined that the image data is associated with the posting data. Since the image data is image data transmitted by being added to the posting data, this image data will be referred to as "added image data". When the terminal presence determination unit 543 determines that the image data is associated with the posting data specified in step S3 (step S51: YES), the flow proceeds to step S52. On the other hand, when the terminal presence determination unit 543 determines that the image data is not associated with the posting data specified in step S3 (step S51: NO), the terminal presence determination unit 543 determines that the mobile terminal 1 was "not in the near range" (step S58) and returns to the process illustrated in FIG. 5. Alternatively, in this case, the flow may proceed to any one of the processes of FIG. 7, FIG. 8A, and FIG. 8B.

In step S52, the terminal presence determination unit 543 acquires the image capturing date and time from the added image data and acquires the posting data transmission date and time from the posting data specified in step S3. Subsequently, the terminal presence determination unit 543 determines whether the time difference between the image capturing time of the added image data and the posting data transmission time specified in step S3 is equal to or smaller than a predetermined value (for example, several tens of seconds) based on the image capturing date and time and the transmission date and time acquired in step S52 (step S53). Moreover, when it is determined that the time difference between the image capturing time of the added image data and the posting data transmission time specified in step S3 is not equal to or smaller than the predetermined value (step S53: NO), the terminal presence determination unit 543 determines that the mobile terminal 1 was "not in the near range" (step S58) and returns to the process illustrated in FIG. 5.

On the other hand, when the terminal presence determination unit 543 determines that the time difference between the image capturing time of the added image data and the posting data transmission time specified in step S3 is equal to or smaller than the predetermined value (step S53: YES), the flow proceeds to step S54. In step S53, when the condition that the time difference between the image capturing time of the added image data and the posting data transmission time specified in step S3 is equal to or smaller than the predetermined value is satisfied, it can be estimated that it is highly likely that the user of the mobile terminal 1 had captured a picture image and transmitted the posting data from the mobile terminal 1 immediately without moving too much. Due to this, in this case, it can be determined that it is highly likely that the mobile terminal 1 which is the transmitter had been present in the near range of the position corresponding to the position information acquired in step S4 at the time of transmitting the posting data specified in step S3. Thus, the terminal presence determination unit 543 may be configured to determine that the mobile terminal 1 was "in the near range" and return to the process illustrated in FIG. 5. However, in order to increase the reliability of the determination that the mobile terminal 1 was in the near range, it is more preferable to proceed to step S54.

In step S54, the terminal presence determination unit 543 determines whether the position information of the image capturing point is added to the added image data as a geotag, for example. When the terminal presence determination unit 543 determines that the position information of the image capturing point is added to the added image data (step S54: YES), the flow proceeds to step S55. The position information added to the image data will be referred to as "position information of the image data". On the other hand, when the terminal presence determination unit 543 determines that the position information of the image capturing point is not added to the added image data (step S54: NO), the flow proceeds to step S56.

In step S55, the terminal presence determination unit 543 determines whether a predetermined condition that the position indicated by the position information acquired in step S4 and the position (that is, the image capturing point) indicated by the position information of the added image data are determined to be in a near range is satisfied. An example of this predetermined condition is a condition that the distance between the position (for example, a plane position specified by an address or the latitude and longitude) indicated by the position information acquired in step S4 and the position (a plane position specified by the latitude and longitude) indicated by the position information of the added image data is within a predetermined distance. Alternatively, an example of this predetermined condition is a condition that both the position indicated by the position information acquired in step S4 and the position indicated by the position information of the added image data are within a predetermined area. When it is determined that the predetermined condition is not satisfied (step S55: NO), the terminal presence determination unit 543 determines that the mobile terminal 1 was "not in the near range" (step S58) and returns to the process illustrated in FIG. 5. On the other hand, when it is determined that the predetermined condition is satisfied (step S55: YES), the terminal presence determination unit 543 determines that the mobile terminal 1 was "in the near range" (step S59) and returns to the process illustrated in FIG. 5.

In step S56, the terminal presence determination unit 543 determines whether the word or the phrase indicating that the image of the added image data is captured at the spot corresponding to the keyword included in the posting data specified in step S3 are included in the posting data. A phrase means, for example, a group of words that expresses one meaning. The word and the phrase are constituent components of a sentence. The spot corresponding to the keyword included in the posting data will be referred to as a "specific spot". An example of a phrase indicating that the image was captured at the specific spot is "captured at AA Hotel". Here, the phrase "captured at" may be registered in a word list stored in advance in the storage unit 52, for example, so that the terminal presence determination unit 543 refers to the word list during the determination in step S56. When it is determined that the word or the phrase indicating that the image was captured at the specific spot is not included in the posting data specified in step S3 (step S56: NO), the terminal presence determination unit 543 proceeds to step S57. On the other hand, when it is determined that the word or the phrase indicating that the image was captured at the specific spot is included in the posting data specified in step S3 (step S56: YES), the terminal presence determination unit 543 determines that the mobile terminal 1 was "in the near range" (step S59) and returns to the process illustrated in FIG. 5.

In step S57, the terminal presence determination unit 543 determines whether a subject extracted from the added image data is a predetermined standard subject that can be captured at the specific spot. Here, for example, the subject is extracted from the image data according to a known image recognition technique. Moreover, the features of the extracted subject are extracted to obtain a feature amount. When the difference between the feature amount obtained in this way and a feature amount of the standard subject set in advance in association with the keyword is within a threshold value, it is determined that the subject extracted from the added image data is the predetermined standard subject. When it is determined that the subject extracted from the added image data is not the predetermined standard subject (step S57: NO), the terminal presence determination unit 543 determines that the mobile terminal 1 was "not in the near range" (step S58) and returns to the process illustrated in FIG. 5. On the other hand, when it is determined that the subject extracted from the added image data is the predetermined standard subject (step S57: YES), the terminal presence determination unit 543 determines that the mobile terminal 1 was "in the near range" (step S59) and returns to the process illustrated in FIG. 5.

When it is determined in step S54 that the position information of the image capturing point is not added to the added image data, the process of step S57 may be performed with higher priority than the process of step S56. In this case, the process of step S56 is performed when it is determined that the subject extracted from the added image data is not the predetermined standard subject. Moreover, when it is determined in step S54 that the position information of the image capturing point is added to the added image data, the process of step S56 or the process of step S57 may be performed with higher priority than the process of step S55.

Figure 7:
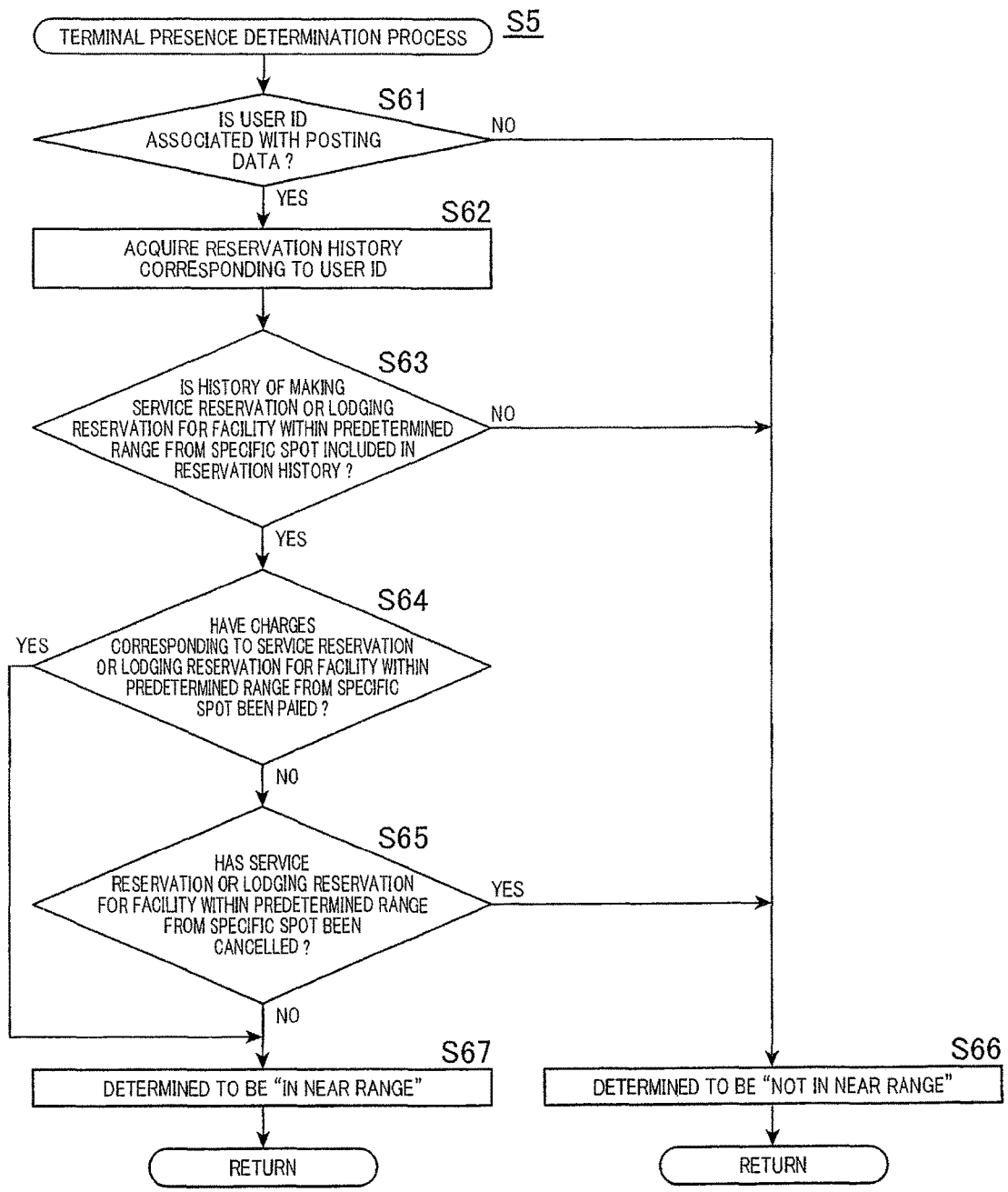
FIG. 7 is a flowchart illustrating a specific example of a terminal presence determination process in step S5.

Next, the terminal presence determination process illustrated in FIG. 7 will be described. In the process illustrated in FIG. 7, first, the terminal presence determination unit 543 determines whether the user ID is associated with the posting data specified in step S3 (step S61). For example, when the user ID is registered in the posting management database 31 in associated with the posting data specified in step S3, it is determined that the user ID is associated with the posting data. When the terminal presence determination unit 543 determines that the user ID is associated with the posting data (step S61: YES), the flow proceeds to step S62. On the other hand, when it is determined that the user ID is not associated with the posting data (step S61: NO), the terminal presence determination unit 543 determines that the mobile terminal 1 was "not in the near range" (step S66) and returns to the process illustrated in FIG. 5. Alternatively, in this case, the flow may proceed to any one of the processes of FIG. 6, FIG. 8C, and FIG. 8D.

In step S62, the terminal presence determination unit 543 acquires the reservation history (that is, the reservation history of the user who posted the posting data) corresponding to the user ID of the user of the mobile terminal 1 which is the transmitter of the posting data specified in step S3 from the reservation management database 523. Subsequently, the terminal presence determination unit 543 determines whether "history of making a service reservation for a facility within a predetermined range (for example, 10 to 20 m) from the specific spot with the day including the posting data transmission date as the date of use" or "history of making service reservation or lodging reservation for a facility within a predetermined range (for example, 10 to 20 m) from the specific spot with the day or the day before the day including the posting data transmission date as an accommodation date," of the user of the mobile terminal 1 which is the transmitter of the posting data specified in step S3 is included in the reservation history acquired in step S62

(step S63). Here, whether the facility indicated by the reservation history is within a predetermined range from the specific spot is determined by comparing the position information indicating the position of the specific spot with the place (for example, the address or the position information indicating the latitude and longitude) of the facility indicated by the reservation history. When it is determined that the history of making service reservation or lodging reservation for the facility within the predetermined range from the specific spot is not included in the reservation history (step S63: NO), the terminal presence determination unit 543 determines that the mobile terminal 1 was "not in the near range" (step S66) and returns to the process illustrated in FIG. 5.

On the other hand, when the terminal presence determination unit 543 determines that the history of making service reservation or lodging reservation for the facility within the predetermined range from the specific spot (step S63: YES), the flow proceeds to step S64. When it is determined in step S63 that the condition that the history of making the service reservation or the lodging reservation for the facility within the predetermined range from the specific spot is included in the reservation history is satisfied, the terminal presence determination unit 543 may be configured to determine that the mobile terminal 1 was "in the near range" and return to the process illustrated in FIG. 5 since it can be determined that it is likely that the mobile terminal 1 which is the transmitter had been present in the near range of the position corresponding to the position information acquired in step S4 at the time of transmitting the posting data. However, in order to increase the reliability of the determination that the mobile terminal 1 was in the near range, it is more preferable to proceed to step S64.

In step S64, the terminal presence determination unit 543 determines whether the charges corresponding to the service reservation or the lodging reservation for the facility within the predetermined range from the specific spot have been paid based on the reservation history acquired in step S62. When it is determined that the charges corresponding to the service reservation or the lodging reservation for the facility within the predetermined range from the specific spot have not been paid (step S64: NO), the terminal presence determination unit 543 proceeds to step S65. On the other hand, when it is determined that the charges corresponding to the service reservation or the lodging reservation for the facility within the predetermined range from the specific spot have been paid (step S64: YES), the terminal presence determination unit 543 determines that the mobile terminal 1 was "in the near range" (step S67) and returns to the process illustrated in FIG. 5.

In step S65, the terminal presence determination unit 543 determines whether the service reservation or the lodging reservation for the facility within the predetermined range from the specific spot has been cancelled based on the reservation history acquired in step S62. When it is determined that the service reservation or the lodging reservation for the facility within the predetermined range from the specific spot has not been cancelled (step S65: NO), the terminal presence determination unit 543 determines that the mobile terminal 1 was "in the near range" (step S67) and returns to the process illustrated in FIG. 5. On the other hand, when it is determined that the service reservation or the lodging reservation for the facility within the predetermined range from the specific spot has been cancelled (step S65: YES), the terminal presence determination unit 543 determines that the mobile terminal 1 was "not in the near range" (step S66) and returns to the process illustrated in FIG. 5.

When it is determined in step S63 that the history of making the service reservation or the lodging reservation for the facility within the predetermined range from the specific spot is included in the reservation history, the process of step S65 may be performed with higher priority than the process of step S64. In this case, for example, the process of step S64 may be performed when it is determined that the service reservation or the lodging reservation for the facility within the predetermined range from the specific spot has not been cancelled.

Figure 8A:
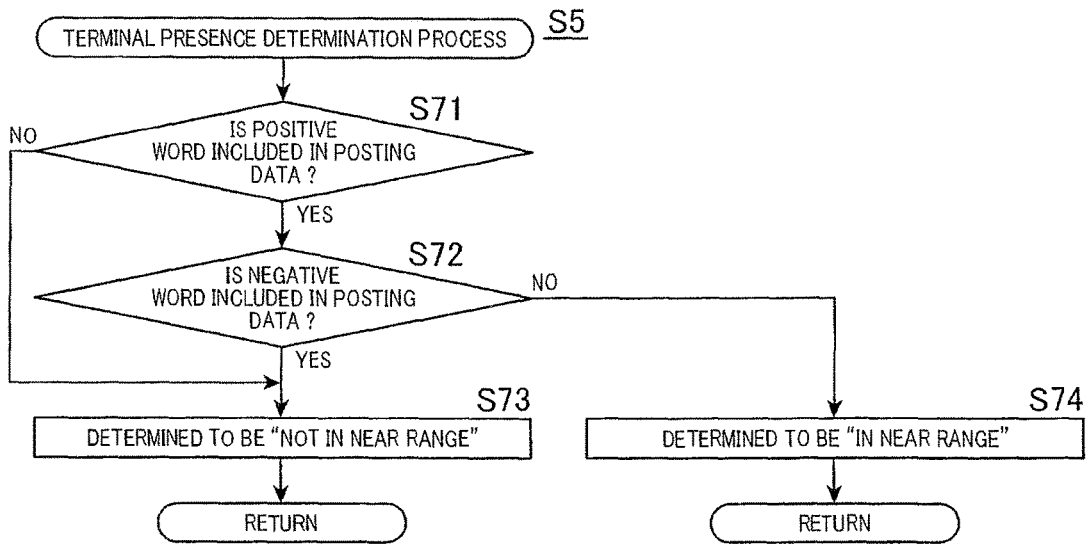
FIG. 8A to FIG. 8B are flowcharts illustrating a specific example of a terminal presence determination process in step S5.

Next, the terminal presence determination process illustrated in FIG. 8A will be described. In the process illustrated in FIG. 8A, first, the terminal presence determination unit 543 determines whether the word or the phrase expressed with the assumption that the poster (that is, the user of the mobile terminal 1 which is the transmitter) was at the specific spot at the time of transmitting the posting data specified in step S3 is included in the posting data (step S71). Here, examples of the word or the phrase (hereinafter collectively referred to as a "positive word") expressed with the assumption that the poster is at the specific spot include "now," "now, ~ is" ("~" is a word or a phrase that is not particularly limited), "presently," and "now". If such a positive word is included, it can be thought that it is highly likely that the posting data was posted in front of the specific spot. The words or the phrases included in the front half part and the latter half part of a sentence may appear in sequence. For example, in the sentence "now, ~ is in front of ~", a positive word may include the front half part "now," and the latter half part "~ is in front of ~" which appear in sequence. On the other hand, for example, if "今 (now)" only is used as the positive word, expressions such as "今日は~です (today is ~)" and "今治は綺麗です (Imabari is beautiful)" used without assumption that the poster was at the specific spot are also included, the positive word may be configured to include a punctuation mark, a comma, a period, and the like. Such a positive word may be registered in a positive word list stored in advance in the storage unit 52, for example, so that the terminal presence determination unit 543 refers to the positive word list during the determination of step S71. Alternatively, a black list that registers an exclusion word or an exclusion phrase such as "今日 (today)" or "今治 (Imabari)" may be stored in advance in the storage unit 52, for example, so that a negative determination result is obtained in step S71 if the word or the phrase included in the black list is included in the posting data specified in step S3.

When the terminal presence determination unit 543 determines that the positive word is included in the posting data specified in step S3 (step S71: YES), the flow proceeds to step S72. In this case, the terminal presence determination unit 543 may determine that the mobile terminal 1 was not "in the near range" (step S74) and return to the process illustrated in FIG. 5. However, in order to increase the reliability of the determination that the mobile terminal 1 was in the near range, it is more preferable to proceed to step S72. On the other hand, when it is determined that the positive word is not included in the posting data specified in step S3 (step S71: NO), the terminal presence determination unit 543 determines that the mobile terminal 1 was "not in the near range" (step S73) and returns to the process illustrated in FIG. 5. Alternatively, in this case, the flow may proceed to any one of the processes of FIG. 6, FIG. 7, and FIG. 8B.

In step S72, the terminal presence determination unit 543 determines whether the word or the phrase expressed with the assumption that the poster (that is, the user of the mobile terminal 1 which is the transmitter) was not at the specific spot at the time of transmitting the posting data specified in step S3 is included in the posting data. Here, examples of the word or the phrase (hereinafter collectively referred to as a "negative word") expressed with the assumption that the poster was not at the specific spot include "soon," "shortly," "before long," and "in hour(s)". If such a negative word is included, it can be thought that it is highly likely that the posting data was posted at a position that cannot be said to be near the specific spot. Such a negative word may be registered in a negative word list stored in advance in the storage unit 52, for example, so that the terminal presence determination unit 543 refers to the negative word list during the determination of step S72.

When it is determined that the negative word is included in the posting data specified in step S3 (step S72: YES), the terminal presence determination unit 543 determines that the mobile terminal 1 was "not in the near range" (step S73) and returns to the process illustrated in FIG. 5. On the other hand, when it is determined that the negative word is not included in the posting data specified in step S3 (step S72: NO), the terminal presence determination unit 543 determines that the mobile terminal 1 was "in the near range" (step S74) and returns to the process illustrated in FIG. 5.

The process of step S72 may be performed with higher priority than the process of step S71. In this case, when it is determined in step S72 that the negative word is not included in the posting data specified in step S3, the process of step S71 is performed. On the other hand, when the negative word is included in the posting data specified in step S3, it is determined that the mobile terminal 1 was "not in the near range" and the flow returns to the process illustrated in FIG. 5.

Figure 8B:
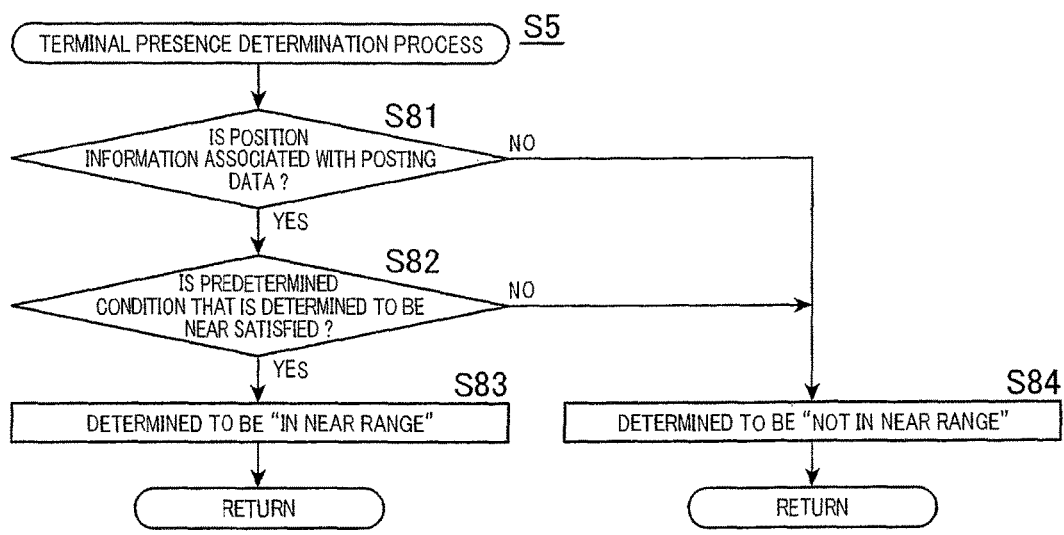

Next, the terminal presence determination process illustrated in FIG. 8B will be described. In the process illustrated in FIG. 8B, first, the terminal presence determination unit 543 determines whether the position information is associated with the posting data itself specified in step S3 (step S81). For example, when the position information is registered in the posting management database 31 in association with the posting data specified in step S3, it is determined that the position information is associated with the posting data itself. When the terminal presence determination unit 543 determines that the position information is associated with the posting data itself (step S81: YES), the flow proceeds to step S82. On the other hand, when it is determined that the position information is not associated with the posting data itself (step S81: NO), the terminal presence determination unit 543 determines that the mobile terminal 1 was "not in the near range" (step S84) and returns to the process illustrated in FIG. 5. Alternatively, in this case, the flow may proceed to any one of the processes of FIG. 6, FIG. 7, and FIG. 8A.

In step S82, the terminal presence determination unit 543 determines whether a predetermined condition that the position indicated by the position information acquired in step S4 and the position (that is, the posting data transmission point) indicated by the position information added to the posting data specified in step S3 are determined to be in a near range is satisfied. This predetermined condition is the same as that of step S55. When it is determined determines that the predetermined condition is not satisfied (step S82: NO), the terminal presence determination unit 543 determines that the mobile terminal 1 was "not in the near range" (step S84) and returns to the process illustrated in FIG. 5. On the other hand, when it is determined that the predetermined condition is satisfied (step S82: YES), the terminal presence determination unit 543 determines that the mobile terminal 1 was "in the near range" (step S83) and returns to the process illustrated in FIG. 5.

Returning to the process illustrated in FIG. 5, it is determined in step S6 whether it is determined in step S5 that the mobile terminal 1 was "in the near range". When it is determined that the mobile terminal 1 was "in the near range" (step S6: YES), the position information output unit 544 outputs the position information acquired in step S4 to the position management database 524, for example, as information indicating the position at which the mobile terminal 1 can connect to the mobile communication network MN via which the posting data specified in step S3 was transmitted (step S7) and proceeds to step S8. Moreover, a processing completion flag is registered in the posting management database 522 in association with the posting data specified in step S3.

In the terminal presence determination process (step S5) illustrated in FIG. 5, the terminal presence determination unit 543 may be configured to return to the process illustrated in FIG. 5 (that is, proceed to step S6) after performing all processes illustrated in FIG. 6, FIG. 7, FIG. 8A, and FIG. 8B. In this case, if the number of processes in which it is determined in the processes of FIG. 6, FIG. 7, FIG. 8A, and FIG. 8B that the mobile terminal was "in the near range" is a predetermined number or more (for example, three or more or four or more), it is determined in step S6 that the mobile terminal 1 was "in the near range" and the position information acquired in step S4 is output.

In this way, the position information at which the mobile terminal 1 can connect to the mobile communication network MN via which the posting data specified in step S3 was transmitted is registered in the position management database 524. Here, it is preferable that the information output by the position information output unit 544 includes the information indicating the communication carrier operating the mobile communication network MN via which the posting data specified in step S3 was transmitted as well as the position information acquired in step S4. This is because data indicating the records that the communication function (a communication function using the mobile communication network MN) of the mobile terminal 1 was used near the specific spot can be accumulated for each communication carrier. Based on the data accumulated in this manner, it is possible to provide information for determining whether the communication function of the mobile terminal 1 can be used at the position of the specific spot in a facility such as a hotel or near the position to the users of the hotel, for example, on a predetermined website. Further, in the present embodiment, since the position information acquired in step S4 includes the altitude of the specific spot as well as the plane position (latitude and longitude) of the specific spot, data indicating the records reflecting a difference in the altitude such as between on the ground and underground or between near the ground and approximately several hundreds of meters from the ground can be accumulated. In this manner, it is possible to provide information for determining whether the communication function (the communication function using the mobile communication network MN) of the mobile terminal can be used within a station yard and near the ground of a subway station, near the ground and the observation deck of a high-rise building, or on the lower floors and the upper floors of a hotel or the like to the user who receives information based on the data indicating the records.

On the other hand, when it is not determined in step S6 that the mobile terminal 1 was "in the near range" (step S6: NO), the outputting process of the position information output unit 544 is not performed and the flow proceeds to step S8. Moreover, the processing completion flag is registered in the posting management database 522 in association with the posting data specified in step S3.

In step S8, it is determined whether posting data which has not been specified in step S3 is still present in the items of posting data acquired in step S2. When it is determined that the posting data that has not been specified in step S3 is still present (step S8: YES), the flow returns to step S3. In step S3, the posting data which has not been specified yet is specified and the same process as the above is performed. On the other hand, when it is determined that the posting data that has not been specified in step S3 is not present (step S8: NO), the process illustrated in FIG. 5 ends.

The position information output by the position information output unit 544 is used, for example, for narrowing down the facilities in which the communication function of the mobile terminal possessed by the user can be used when the user who wants to use a facility selects the facility to be used. Moreover, the position information output by the position information output unit 544 is used for determining a facility in which the communication function of the mobile terminal possessed by the user can be used when a service provider who provides facilities allocates the user who uses the facility (for example, allocates the rooms of a lodging facility). In addition, the position information can be used for improving the services in facilities.

As described above, according to the embodiment, the position analysis processing server 5 is configured to acquire posting data transmitted via the mobile communication network MN from the mobile terminal 1 as the transmitter, acquire the position information corresponding to the keyword included in the acquired posting data, and output the acquired position information as the position at which it is possible to connect to the mobile communication network MN via which the acquired posting data was transmitted. Thus, it is possible to specify the position at which the mobile terminal can communicate via the mobile communication network MN independently from the GPS. In order words, according to the present embodiment, it is possible to obtain the position information indicating such a position even when the position is such an obstructed position that the GPS does not function properly, for example.

According to the embodiment, the position analysis processing server 5 is configured to acquire posting data transmitted via the mobile communication network MN from the mobile terminal 1 as the transmitter, acquire the position information corresponding to the keyword included in the acquired posting data, and output the acquired position information as the position at which it is possible to connect to the mobile communication network MN via which the acquired posting data was transmitted when it is determined that the mobile terminal 1 which is the transmitter had been present in the near range near the position corresponding to the acquired position information at the time of transmitting the posting data based on the related information which contributes to determination of the position at which the mobile terminal 1 which is the transmitter was present at the time of transmitting the acquired posting data. Thus, it is possible to specify the position at which the mobile terminal can communicate via the mobile communication network MN with higher accuracy.

REFERENCE SIGN LIST

1 Mobile terminal
2 Gateway server
3 Posting processing server
4 Reservation processing server
5 Position analysis processing server
MN Mobile communication network
IN Internet
S Information providing system

The invention claimed is:

1. An information processing apparatus, comprising:
at least one memory operable to store program code; and
at least one processor operable to read the program code and operate as instructed by the program code, the program code including:
first acquiring code configured to cause at least one of said at least one processor to acquire posting data which is transmitted via a mobile communication network from a mobile terminal as a transmitter and which includes a keyword indicating a predetermined spot;
second acquiring code configured to cause at least one of said at least one processor to acquire the position information corresponding to the keyword included in the posting data acquired by the first acquiring code from a storage that stores the keyword indicating the predetermined spot and position information indicating a position of the spot in association with each other;
outputting code configured to cause at least one of said at least one processor to output the position information acquired by the second acquiring code as information indicating a position at which it is possible to connect to the mobile communication network via which the posting data acquired by the first acquiring code was transmitted; and
determining code configured to cause at least one of said at least one processor to determine whether a mobile terminal which is the transmitter had been present in a range near a position indicated by the position information acquired by the second acquiring code at the time of transmitting the posting data based on related information acquired in association with the posting data, which contributes to determination of the position at which the mobile terminal which is the transmitter was present at the time of transmitting the posting data acquired by the first acquiring code,
wherein the outputting code is further configured to cause at least one of said at least one processor to output the position information acquired by the second acquiring code when the determining code determines that the mobile terminal had been present in the range.

2. The information processing apparatus according to claim 1,
wherein the first acquiring code is further configured to cause at least one of said at least one processor to acquire the posting data to which image data is added as the related information, and
the determining code is further configured to cause at least one of said at least one processor to determine that the mobile terminal had been present in the range near the position at the time of transmitting the posting data when at least a condition that a time difference between an image capturing time of the image data added to the posting data and the posting data transmission time is a predetermined value or smaller is satisfied.

3. The information processing apparatus according to claim 2,
wherein position information of the image capturing point is added to the image data, and
the determining code is further configured to cause at least one of said at least one processor to determine that the mobile terminal had been present in the range near the position at the time of transmitting the posting data when the condition is satisfied and a predetermined condition that the position indicated by the position information acquired by the second acquiring code is determined to be near the position indicated by the position information added to the image data is satisfied.

4. The information processing apparatus according to claim 2,
wherein the determining code is further configured to cause at least one of said at least one processor to determine that the mobile terminal had been present in the range near the position at the time of transmitting the posting data when the condition is satisfied and a word or a phrase indicating that the image of the image data was captured at the spot is included in the posting data.

5. The information processing apparatus according to claim 2,
wherein the determining code is further configured to cause at least one of said at least one processor to determine that the mobile terminal had been present in the range near the position at the time of transmitting the posting data when the condition is satisfied and a subject extracted from the image data is a predetermined subject that can be captured at the spot.

6. The information processing apparatus according to claim 1,
wherein the determining code is further configured to cause at least one of said at least one processor to determine that the mobile terminal had been present in the range near the position at the time of transmitting the posting data when at least a condition that a reservation history of making use reservation for a facility within a predetermined range from the spot with a day including the posting data transmission time as the date of use or a reservation history of making lodging reservation for the facility with the day before or the day including the posting data transmission time as an accommodation date, of the user who posted the posting data is stored as the related information, is stored in a storage that stores a reservation history of a user having made facility use reservation or lodging reservation, is satisfied.

7. The information processing apparatus according to claim 6,
wherein the determining code is further configured to cause at least one of said at least one processor to determine that the mobile terminal had been present in the range near the position at the time of transmitting the posting data when the condition is satisfied and the use reservation or the lodging reservation is not cancelled.

8. The information processing apparatus according to claim 6,
wherein the determining code is further configured to cause at least one of said at least one processor to determine that the mobile terminal had been present in the range near the position at the time of transmitting the posting data when the condition is satisfied and charges corresponding to the use reservation or the lodging reservation are paid.

9. The information processing apparatus according to claim 1,
wherein the determining code is further configured to cause at least one of said at least one processor to determine that the mobile terminal had been present in the range near the position at the time of transmitting the posting data when a word or a phrase expressed with the assumption that a poster was at the spot at the time of transmitting the posting data is included in the posting data as the related information.

10. The information processing apparatus according to claim 1,
wherein the first acquiring code is further configured to cause at least one of said at least one processor to acquire the posting data to which position information is added as the related information, and
the determining code is further configured to cause at least one of said at least one processor to determine that the mobile terminal had been present in the range near the position at the time of transmitting the posting data when a predetermined condition that the position indicated by the position information acquired by the second acquiring code is determined to be near the position indicated by the position information added to the posting data is satisfied.

11. An information processing method executed by a computer, comprising:
acquiring posting data which is transmitted via a mobile communication network from a mobile terminal as a transmitter and which includes a keyword indicating a predetermined spot;
acquiring the position information corresponding to the keyword included in the posting data acquired from a storage that stores the keyword indicating the predetermined spot and position information indicating a position of the spot in association with each other;
outputting the position information acquired as information indicating a position at which it is possible to connect to the mobile communication network via which the posting data acquired was transmitted;
determining whether a mobile terminal which is the transmitter had been present in a range near a position indicated by the position information acquired at the time of transmitting the posting data based on related information acquired in association with the posting data, which contributes to determination of the position at which the mobile terminal which is the transmitter was present at the time of transmitting the posting data acquired; and
outputting the position information acquired when it is determined that the mobile terminal had been present in the range.

12. A non-transitory computer-readable recording medium storing thereon an information processing program, which causes a computer to:

acquire posting data which is transmitted via a mobile communication network from a mobile terminal as a transmitter and which includes a keyword indicating a predetermined spot;

acquire the position information corresponding to the keyword included in the posting data acquired from a storage that stores the keyword indicating the predetermined spot and position information indicating a position of the spot in association with each other;

output the position information acquired as information indicating a position at which it is possible to connect to the mobile communication network via which the posting data acquired was transmitted;

determine whether a mobile terminal which is the transmitter had been present in a range near a position indicated by the position information acquired at the time of transmitting the posting data based on related information acquired in association with the posting data, which contributes to determination of the position at which the mobile terminal which is the transmitter was present at the time of transmitting the posting data acquired; and output the position information acquired when it is determined that the mobile terminal had been present in the range.

* * * * *